US008256934B2

(12) United States Patent
Cunius

(10) Patent No.: US 8,256,934 B2
(45) Date of Patent: Sep. 4, 2012

(54) PUCK TYPE LIGHT FIXTURE

(75) Inventor: Jeff R. Cunius, Ontario, CA (US)

(73) Assignee: Troy-CSL Lighting, Inc., City of Industry, CA (US)

( * ) Notice: Subject to any disclaimer, the term of this patent is extended or adjusted under 35 U.S.C. 154(b) by 401 days.

(21) Appl. No.: 12/350,218

(22) Filed: Jan. 7, 2009

(65) Prior Publication Data

US 2010/0172143 A1 Jul. 8, 2010

(51) Int. Cl.
*B60Q 1/06* (2006.01)

(52) U.S. Cl. ........................................ 362/373; 362/294

(58) Field of Classification Search .................. 362/373, 362/294, 263–265, 640, 656, 362, 364–365, 362/368

See application file for complete search history.

(56) References Cited

U.S. PATENT DOCUMENTS

| | | | | |
|---|---|---|---|---|
| 4,947,307 | A * | 8/1990 | Quiogue | 362/325 |
| 6,068,384 | A * | 5/2000 | Tyson et al. | 362/153.1 |
| 6,705,747 | B2 * | 3/2004 | Caferro et al. | 362/291 |
| 7,144,135 | B2 * | 12/2006 | Martin et al. | 362/294 |
| 2005/0237746 | A1 * | 10/2005 | Yiu | 362/294 |
| 2006/0193139 | A1 * | 8/2006 | Sun et al. | 362/373 |
| 2008/0112157 | A1 * | 5/2008 | Boothe et al. | 362/101 |
| 2010/0165630 | A1 * | 7/2010 | Lin et al. | 362/294 |

* cited by examiner

*Primary Examiner* — Julie Shallenberger
(74) *Attorney, Agent, or Firm* — Natan Epstein

(57) ABSTRACT

A puck light fixture has a puck shaped housing, the interior divided by a partition into a circular central compartment encompassed by an outer compartment. Air conduits closed to the housing interior admit flow of ambient air between top and bottom openings in the housing. The air conduits are in heat exchanging relationship with the partition for dissipating heat generated by a lamp in the central compartment and thereby lowering the operating temperature of electrical wiring and connectors in the outer compartment so as to allow use of lower rated wiring for on site hard wiring of the puck fixture.

20 Claims, 9 Drawing Sheets

PUCK TYPE LIGHT FIXTURE

BACKGROUND OF THE INVENTION

1. Field of the Invention

This invention pertains generally to the field of electric light fixtures and more particularly concerns an improved puck type light fixture.

2. State of the Prior Art

So-called puck lights are relatively small light fixtures with a flat circular disk shape reminiscent of a hockey puck. Puck lights are primarily intended for installation in or on wood shelving and cabinets, although they can also be mounted on other surfaces.

Existing puck lights tend to operate at relatively high temperatures because the small enclosures, a few inches in diameter, do not readily dissipate heat from the high intensity halogen or other compact light sources used. Internal temperatures may reach 200 to 250° Centigrade, and electrical codes require use of special high temperature wire connected in the puck light. Such high temperature wires are a specialty item and not usually kept on hand by electrical contractors who install such fixtures. Consequently, puck light manufacturers pre-wire their puck lights with a fixed length of connecting wire which extends from the puck light housing and terminates in a pre installed electrical connector.

UL (Underwriters Laboratories), which certifies such puck light fixtures, does not permit the wiring to be cut if the fixture is sold with a connector in order to remove the connector in order to extend the wiring. Puck lights are often installed in groups where they are most conveniently wired in daisy chain arrangements. However, the factory provided wiring tends to be relatively short, e.g. four inches in length between the puck light housing and the factory installed connector, which sets a maximum spacing between adjacent puck lights of eight inches using the existing wiring. It is desirable to have greater latitude in the spacing of daisy chained puck lights.

Furthermore, UL requires that the puck light fixture allow access to the lamp element in the fixture for relamping without exposing an end user to the electrical wiring in the fixture. Existing puck lights comply with this requirement by providing a removable glass cover held over the lamp element by a spring-loaded retainer, or the like, but do not provide for access to the wiring of the puck light.

For the forgoing reasons, existing puck lights are not installed by "hardwiring" i.e. by leading conventional electrical wiring into the puck light housing and making an interior electrical connection therein for supplying power to the lamp socket of the fixture. Because existing puck lights are sold with factory prewired external power connectors they are known as "portable" fixtures and fall under a different provision of the UL Combined Standards than hard wired luminaires.

A need exists for puck type light fixtures which can be hard-wired in the field using conventional electric power cables without the limitations imposed by factory installed high temperature wiring and connectors.

SUMMARY OF THE INVENTION

The invention provides a puck light having a puck housing including a housing top and a housing bottom, an outer wall between the top and the bottom, a generally annular partition between the top and the bottom dividing the housing into a central compartment and an outer compartment substantially closed to each other, a terminal block in the outer compartment, a lamp socket in the central compartment electrically connected to the terminal block for powering a lamp supported in the central compartment above a light aperture in the housing bottom, air passages through the partition between exterior vent openings in the top and the bottom of the housing, the passages being closed to each compartment such that ambient air may flow through the housing in the air passages in heat exchanging relationship with the partition for reducing heat flow across the partition from the central compartment thereby to maintain relatively low operating temperatures in the outer compartment. Preferably, the lamp socket is in heat sinking contact with the partition such that heat from the socket is dissipated by conduction through the partition and transfer to the flow of ambient air. The terminal block may be held in the outer compartment in a press fit between the outer wall and the partition.

In the presently preferred embodiment of the invention the partition has concentric inner walls connected to each other by spaced apart radial fins or spokes for defining the air passages between the inner walls and between the fins or spokes. The concentric inner walls form an arc of circle and the arc is closed by a socket mounting wall with socket retainers for holding the lamp socket in thermal contact with the mounting wall. The puck housing including the housing top, the outer wall, the inner walls and the radial fins may be all formed as a single unit of heat conductive material, e.g. cast aluminum, and the housing bottom may include a cover plate between the partition and the outer wall for closing the outer compartment, and a lens holder defining the light aperture of the central compartment. The lens holder may be hinged or removable for allowing access to the lamp socket in the central compartment for relamping of the puck fixture. The cover plate may be removable for access to the terminal connection block for hard wiring of the puck fixture in the field. The puck housing has at least one knock-out opening in one or both of the housing top and the outer wall for introducing external electrical wiring into said the compartment for connection to the terminal block.

A domed light reflector may be removably fitted in the central compartment between the housing top and the lamp socket for reflecting light emitted by a lamp installed in the lamp socket toward the light aperture. A center fastener may secure the reflector to the housing top.

In the presently preferred embodiment the cover plate is fastened to the outer wall and the housing top with removable fasteners such as threaded screws and the lens holder is hinged to the cover plate for movement between a closed condition for holding a lens under a lamp in the lamp socket and light reflector and an open position admitting access for installation or replacement of a lamp in the lamp socket. In this preferred embodiment the vent openings of the air passages in the housing bottom are disposed along an arc between the cover plate and the lens holder.

The annular partition also serves as a light baffle against diffusion of light from the lamp in the central compartment into the air passages or into the outer compartment.

The puck housing may be further ventilated with one or more center slots in the housing top for venting the central compartment, with the light reflector providing a light baffle covering the lamp to keep against diffusion of light through such center slots. The puck light may be still further ventilated with one or more outer slots in the housing top for venting the outer compartment.

Holes are provided through the housing top in the outer compartment for passing mounting fasteners for fastening the puck housing to an overlying mounting surface such as a wooden shelf or the like.

More generally, the puck fixture of this invention comprises a puck housing defining a circular central compartment encompassed by an outer compartment between a housing top and a housing bottom, a partition separating the central compartment from the outer compartment and air passages between said housing top and said housing bottom and closed to each said compartment for placing a flow of external ambient air in heat exchanging relationship with said partition thereby to dissipate heat produced by a lamp in said central compartment and thus reduce the temperature in said outer compartment during operation of the puck fixture.

The puck light of this invention may also be understood as comprising a puck housing with a circular central compartment encircled by an outer compartment and spaced therefrom by an annular gap open at a housing top and a housing bottom, fins or spokes across the annular gap interconnecting the central compartment and the outer compartment such that ambient air flowing through the gap between the top and bottom of the housing passes in heat exchanging contact with the fins or spokes thereby to carry away heat generated by operation of a lamp in the central compartment and flowing through the spokes towards the outer compartment, thereby to maintain a lower operating temperature in the outer compartment of the puck light. In this embodiment the central compartment is enclosed by a circular first inner wall, the outer compartment extends radially between a second inner wall and an outer circular wall, and the gap and the spokes extend between the first inner wall and the second inner wall. A lamp socket may be housed in the central compartment in heat exchanging contact with the first inner wall such that heat from the socket flowing through the first inner wall is conducted onto the spokes and there transferred to ambient air flowing through the gap prior to reaching the outer compartment.

These and other improvements, features and advantages of the present invention will be better understood from the following detailed description of the preferred embodiment taken with reference to the accompanying drawings.

DETAILED DESCRIPTION OF THE PREFERRED EMBODIMENTS

Figure 1:
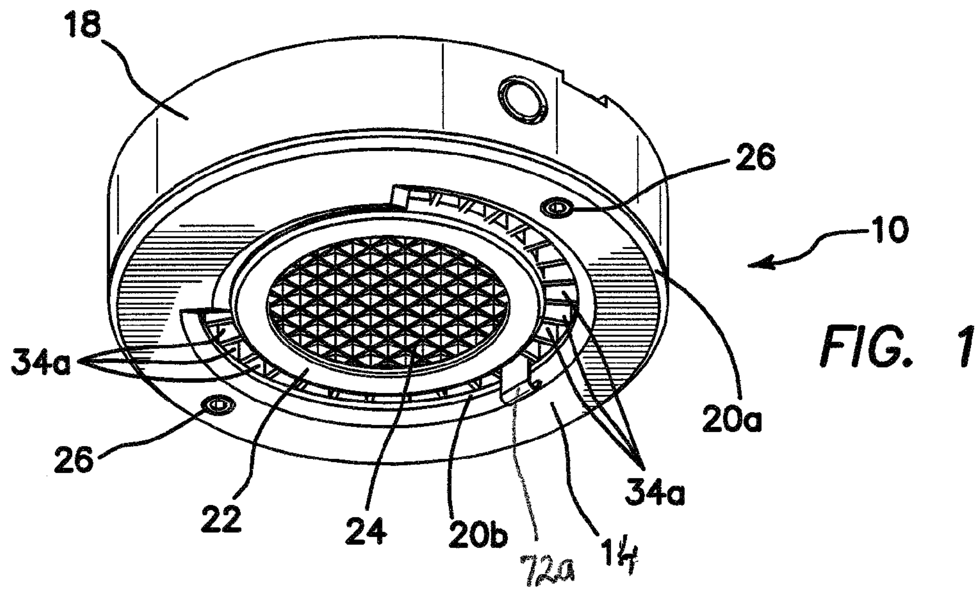
FIG. 1 is a side bottom view of a puck type lighting fixture according to this invention.
Figure 2:
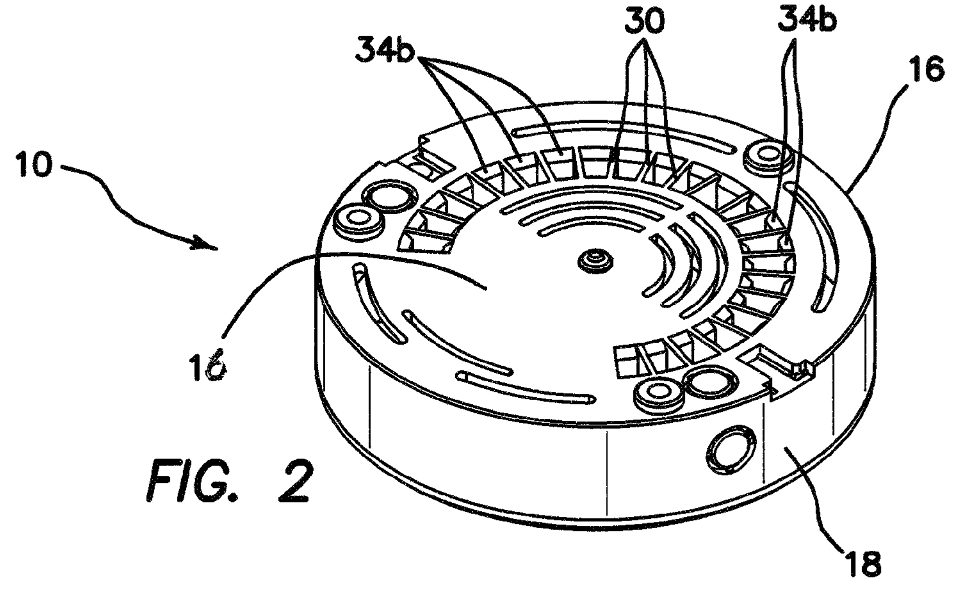
FIG. 2 is a top side perspective view of the puck light of FIG. 1.
Figure 3:
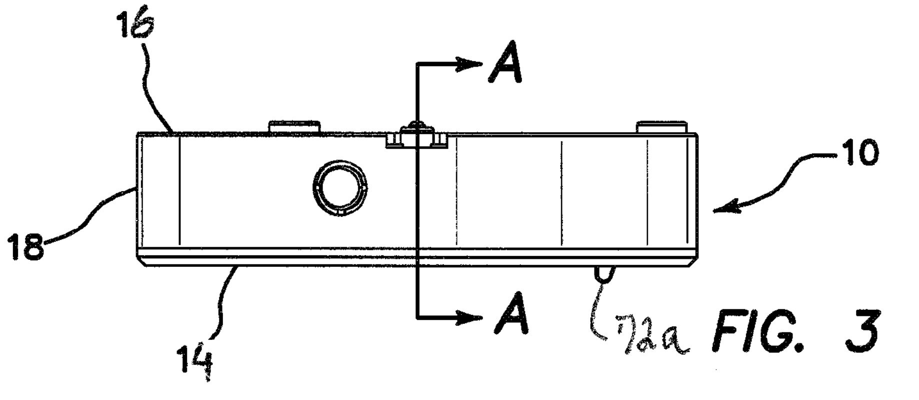
FIG. 3 is a side view of the puck light of FIG. 1.

With reference to the accompanying drawings, in which like elements are designated by like numerals, FIGS. 1, 2 and 3 depict a puck style light fixture generally designated by numeral 10 according to this invention. Puck light 10 may be either surface mounted or recess mounted to the underside of a shelf or the bottom of a wall hung cabinet with its top side 14 supported against an overlying mounting surface, in the case of a surface mount, or recessed in a hole cut in the mounting surface in the case of a recess mounting.

Figure 4:
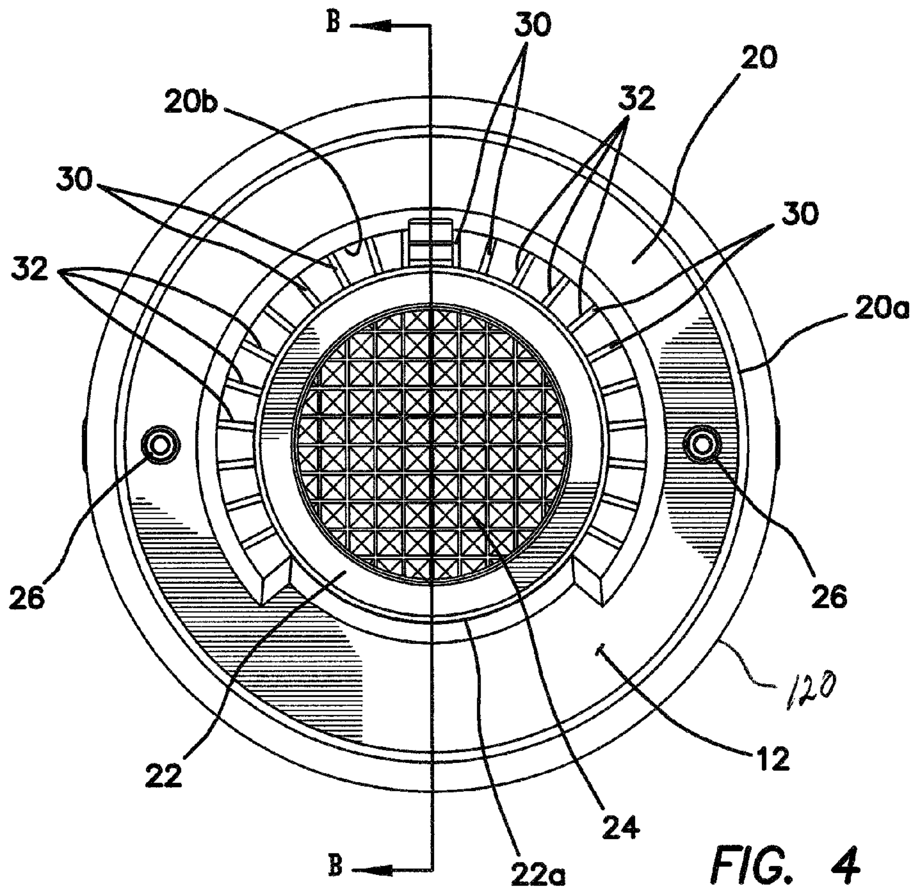
FIG. 4 is a plan view of the bottom of the puck light of FIG. 1.

Puck light 10 has a puck housing 12 with a housing top 14, a housing bottom 16 and a circular outer wall 18 between the housing bottom 16 and the housing top 14. The housing bottom 16 includes a cover plate 20 with a circular outer edge 20*a* and an arcuate inner edge 20*b*. The housing bottom 16 also includes an annular lens holder 22 adapted to hold any of different interchangeable lenses, light filters or baffles, such as the honeycomb light baffle 24 illustrated in FIG. 4. The lens holder 22 is hinged to the cover plate 20 at 22*a* in a manner which will be described below. The cover plate 20 is fastened to the housing 12 of puck light 10 by a pair of threaded fasteners 26.

Figure 5:
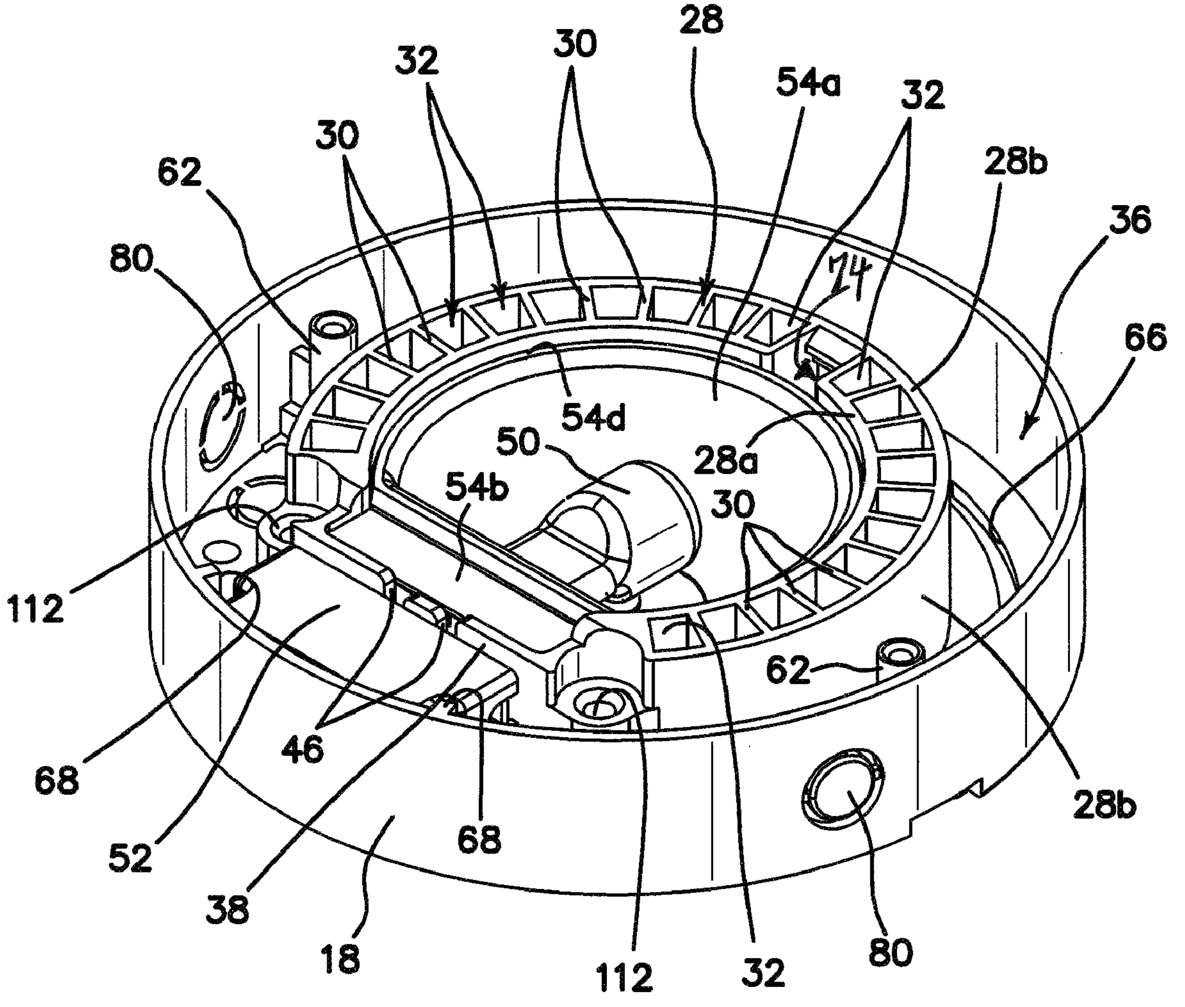
FIG. 5 is a perspective view showing the puck light of FIG. 1 with its bottom cover plate removed to expose the interior of the puck light housing.

FIG. 5 shows the puck light 10 with cover plate 20 and lens holder 22 removed to expose the interior of the fixture housing 12. A partition generally designated by numeral 28 divides the interior of the housing 12 into a generally circular central compartment 34 encompassed by a generally annular outer compartment 36. In an assembled condition of the puck light 10 the two compartments are essentially closed to flow of air between each other. Partition 28 includes two concentric circularly curved inner walls, including a first inner wall 28*a* and a second inner wall 28*b* radially located between the first inner wall 28*a* and outer wall 18. Partition 28 further includes a number of circumferentially spaced apart radial fins or spokes 30. Inner walls 28*a,b* and fins 30 together define a number of air passages 30 arranged in an arc between the central and outer compartments 34, 36. Each of the air passages 30 extends through the thickness of housing 12 between corresponding bottom vent openings 32*a* in the housing bottom 16 and opposite top vent openings 32*b* in housing top 14, as best understood by reference to the cross section in FIG. 10.

The first and second inner walls 28*a*, 28*b* together define a partition arc circumferentially extending approximately ¾ of a circle. This arc is closed by a mounting wall 38 extending between the opposite ends of the arc, to complete the partition 28. A lamp socket 40 is mounted to the mounting wall 38 and held in heat exchanging contact with the mounting wall by socket tabs 42 contained in a socket retaining structure 122 integrally formed on the housing top 14 and the center facing side of mounting wall 38. Retaining structure 122 may consist of four posts in a configuration adapted to receive and hold the socket 40 between them. Mounting of socket 40 in the puck housing 12 merely involves pressing the socket 40 into the retaining structure 122. The lamp socket 40 has a pair of socket pins 44 each of which fits into a corresponding pin slot 46 in mounting wall 38. As a result lamp socket 40 is housed in the central compartment 34 with its flat bottom 40*a* held in thermal contact with the center facing side of mounting wall 38 and with socket pins 44 extending into the outer compartment 36 through pin slots 46. Lamp socket 42 is selected for accepting and powering a desired light source, such as a halogen lamp 50 or an LED element, in central compartment 34 of the puck light 10.

A terminal connector block 52 is contained in the outer compartment 36 between the outer side of mounting wall 38 and the outer wall 18. The terminal block 52 contains a first set of terminals for attaching the electrical conductor wires of a power cable and a second set of terminals for connecting internal insulated wire conductors between terminal block 52 and socket pins 44 in the outer compartment 36, for providing electrical power from the power cable through the internal wires to the lamp socket 40. These internal wires are entirely contained in the outer compartment 36 between the terminal block 52 and pins 44. The radial width of outer compartment 36 is such as to receive terminal block 52 in a press-fit to hold block 52 against significant radial displacement, and ridges 68 are formed on outer wall 18 for also holding terminal block 52 against excessive circumferential along outer compartment 36.

Figure 9:
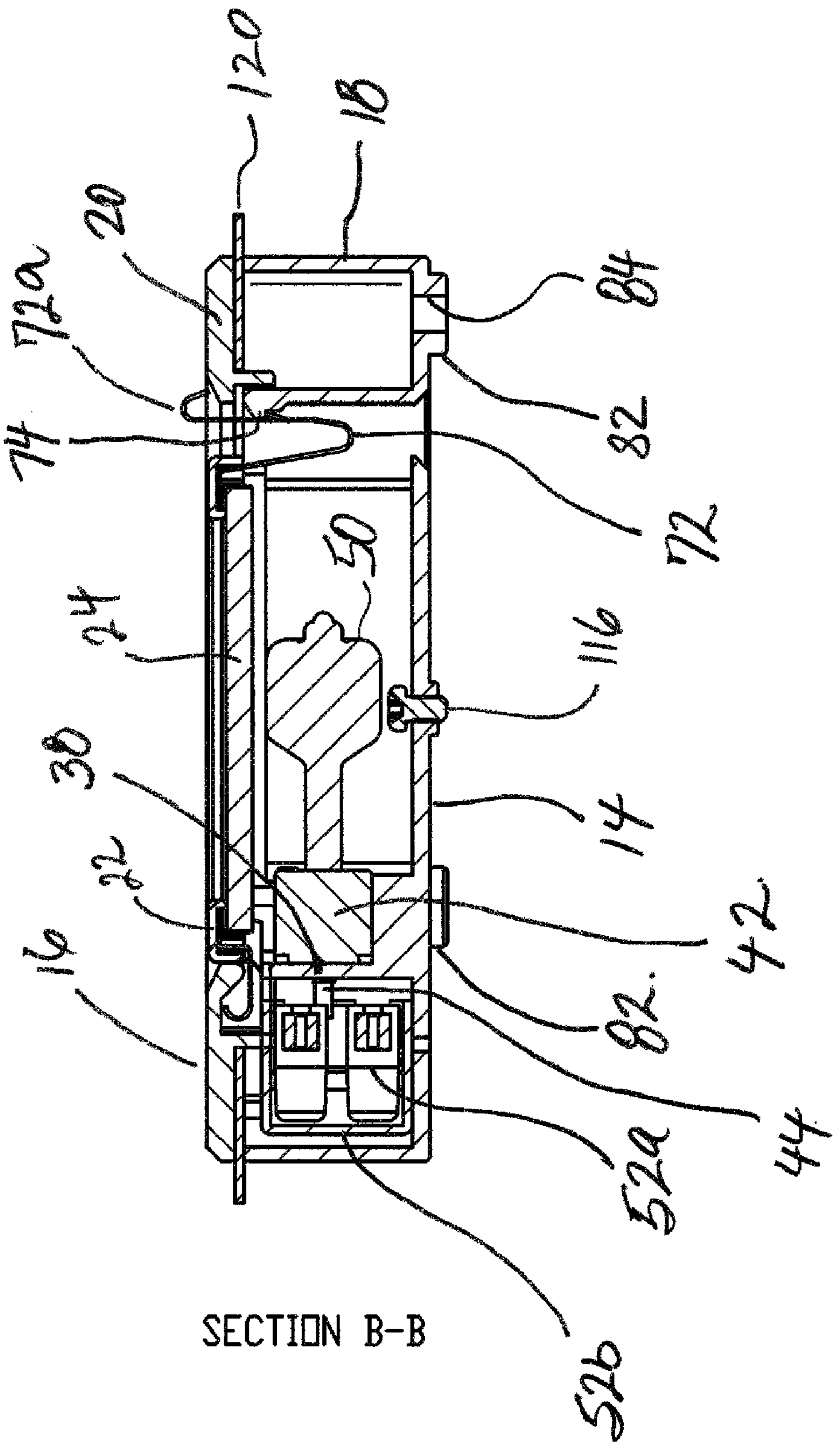
FIG. 9 is a cross-section taken along the line B-B in FIG. 4.

Puck light 10 is further provided with a light reflector 54 which includes a reflector bowl 54*a* and a radially extending reflector tab 54*b* as well as center hole 54*c*. Reflector 54 is fastened by screw fastener 116 through center hole 54*c* and threaded into a center hole 114 provided in the housing top 14. The diameter of reflector bowl 54 is such as to make a close fit with the diameter of the first inner wall 28*a*, with a reflector rim 54*d* resting upon a supporting ledge 28*c* of the first inner wall 28*a*. When reflector 54 is so installed the reflector tab 54*b* overlies and covers lamp socket 40 as best seen in FIGS. 5 and 9. The reflector 54 has a cutout 56, shown in FIG. 7, which allows the pins 44 and the base of lamp bulb 50 to pass through the reflector bowl for installation in lamp socket 40.

Figure 6:
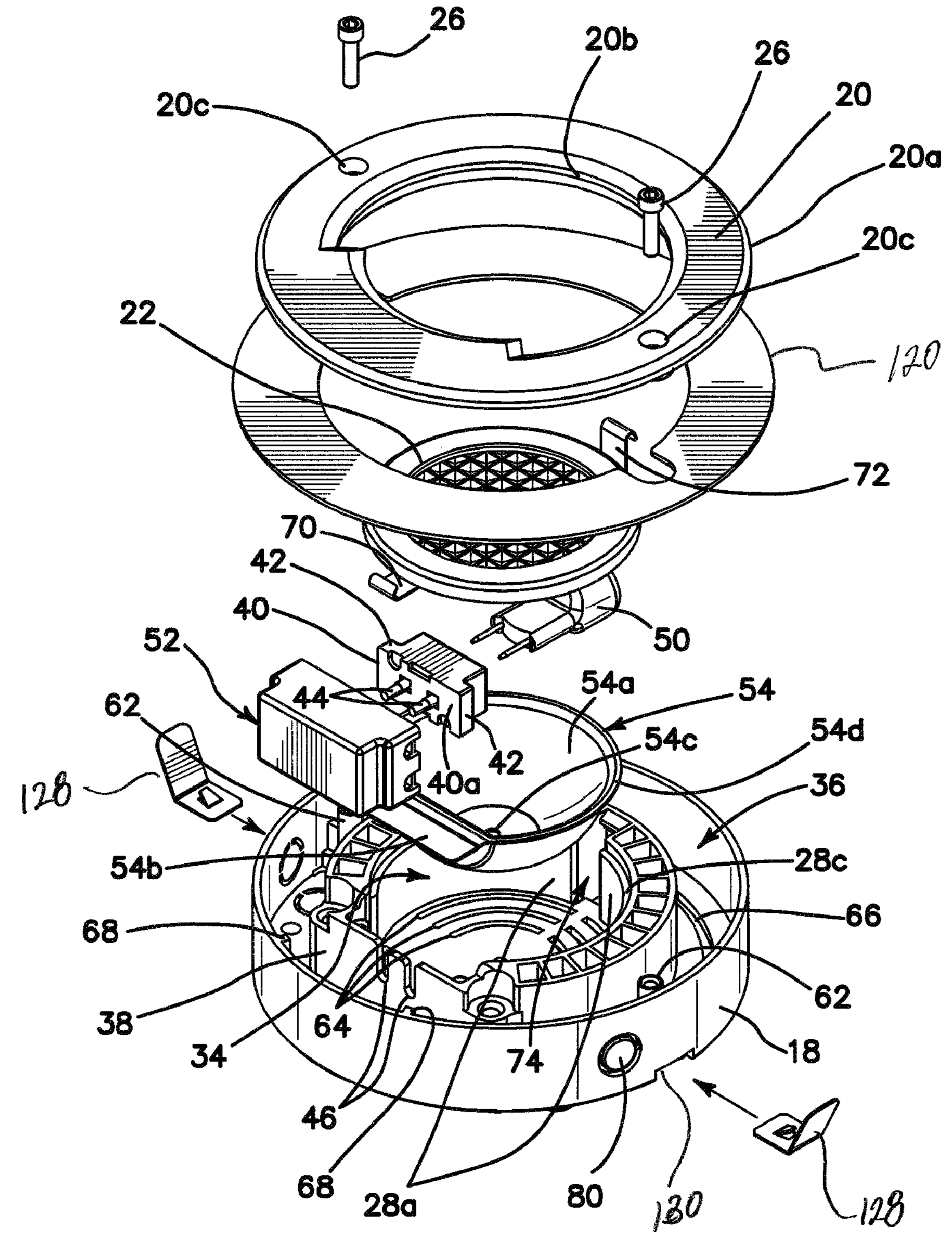
FIG. 6 is an exploded bottom-side perspective view of the puck light of FIG. 1.
Figure 7:
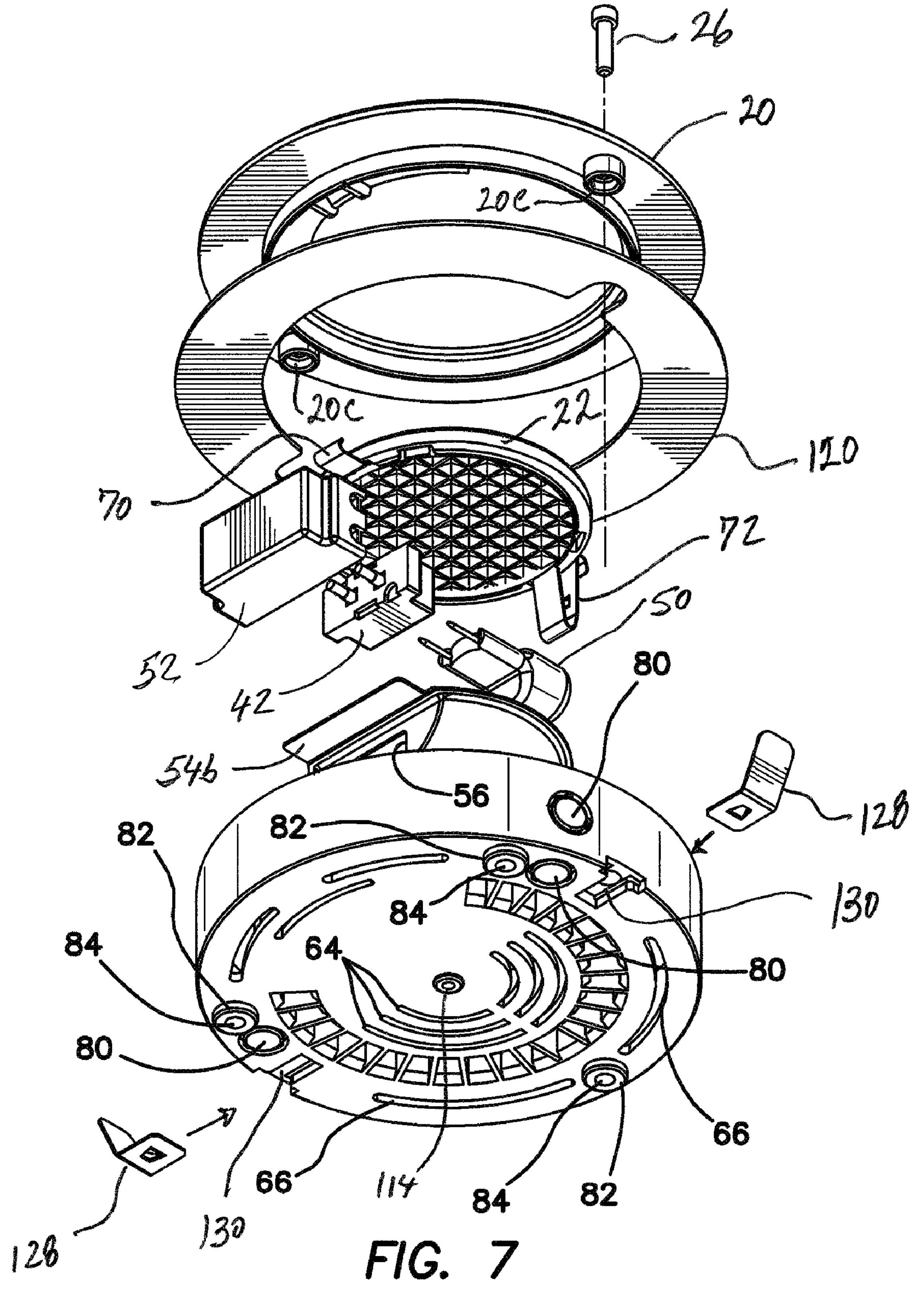
FIG. 7 is an exploded top-side perspective view of the of the puck light of FIG. 1.
Figure 8:
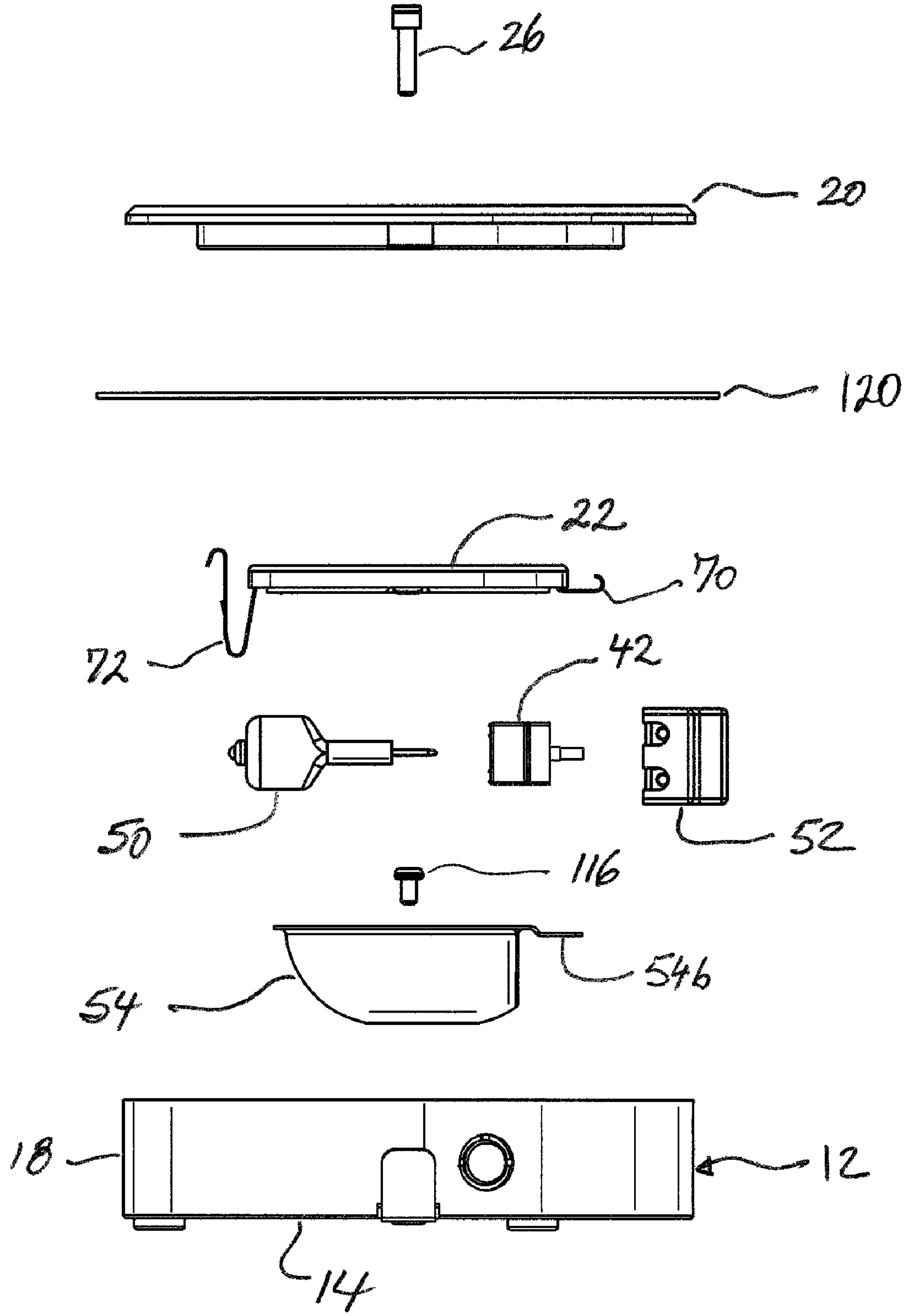
FIG. 8 is an exploded side view of the of the puck light of FIG. 1.

In the exploded views of FIGS. 6, 7 and 8 the reflector 54 is shown between socket 40 and the puck light housing 12 for convenience and clarity of illustration. However, in the assembled condition of the puck light 10 seen in FIG. 5 the lamp socket 40 lies between reflector tab 54*b* and housing top 14, the lamp bulb 50 is contained in reflector bowl 54*a*, and the terminal block 52 is contained in outer compartment 36 between the housing top and the reflector tab 54*b*.

A pair of threaded fasteners 26 pass through corresponding holes 20*c* in cover plate 20 and thread into corresponding internally threaded bosses 62 extending from the housing top for holding the cover plate 20 closed against outer wall 18, and with the inner rim 20*b* of the cover plate lying against the top edge of the second inner wall 28*b*, thereby covering and closing the outer compartment 36. From the foregoing it will be seen that outer compartment 36 is essentially walled-off and closed from the center compartment 34 by the partition 28, and is also covered and closed independently of the center compartment 34.

Figure 4A:
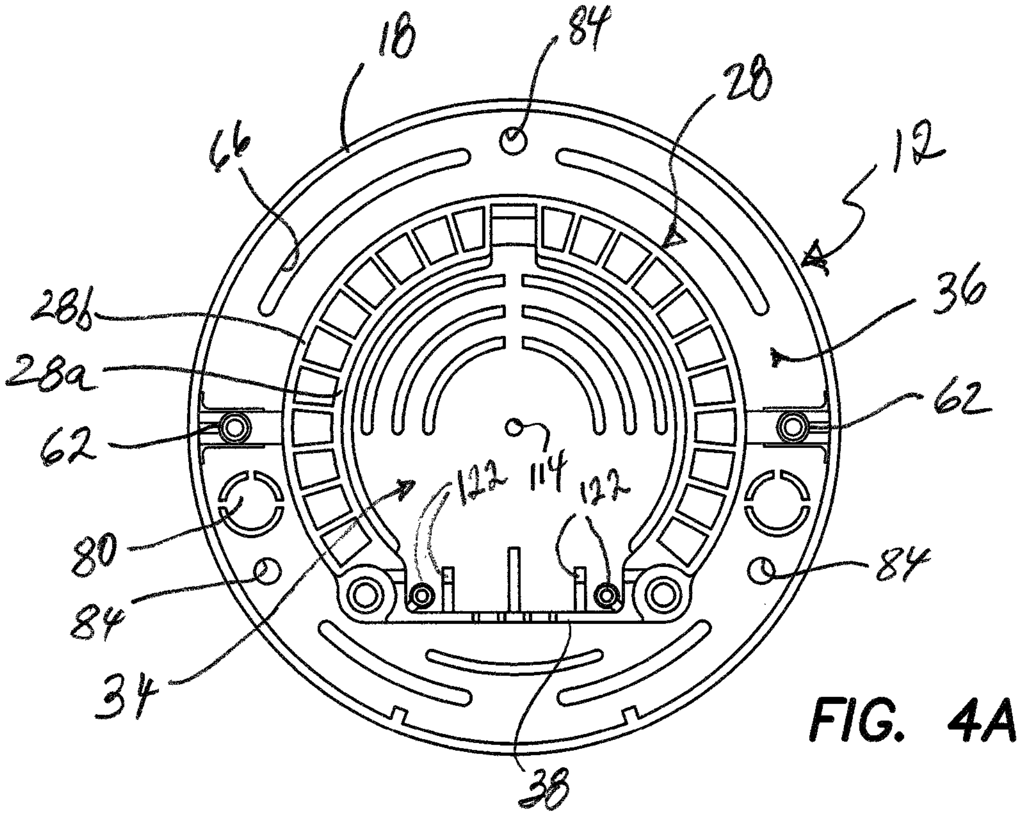
FIG. 4A is a bottom plan view of the open and empty one piece puck housing.
Figure 4B:
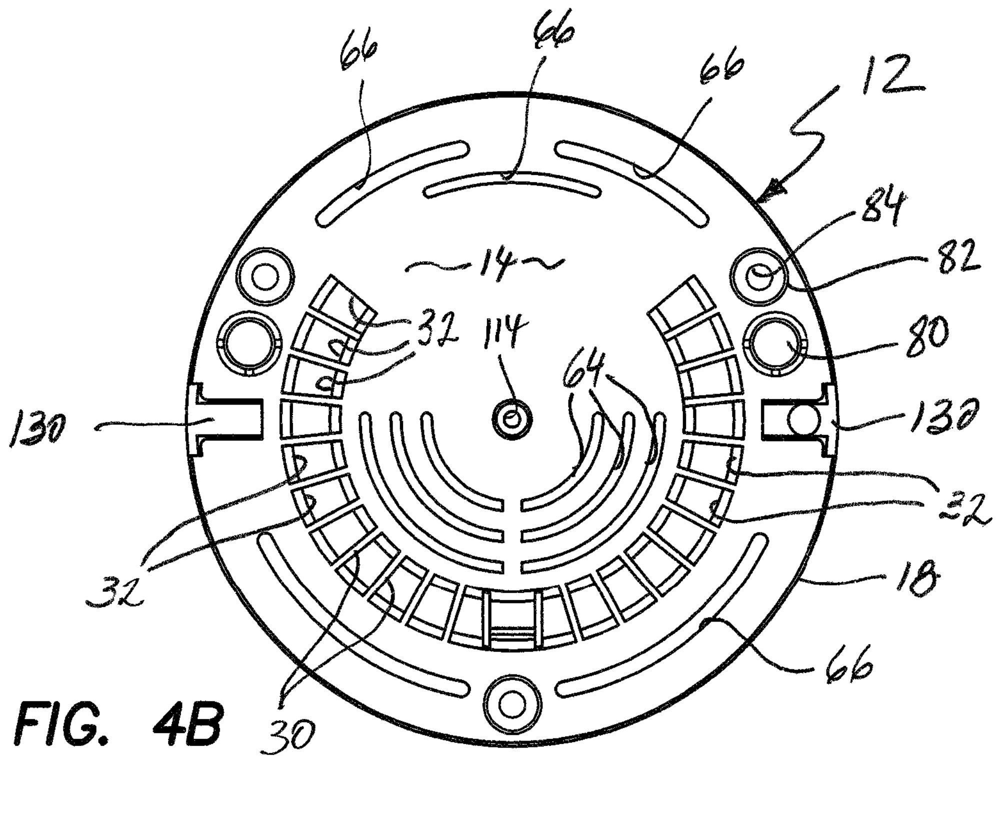
FIG. 4B is a top plan view of the top side of the puck housing.

Each of center and outer compartments 34, 36 is provided with its own top ventilation openings formed through housing top 14, which in the described embodiment take the form of arcuate ventilation slots 64 in central compartment 34 and arcuate ventilation slots 66 in outer compartment 36, as best seen in FIGS. 4A and 4B.

Figure 10:
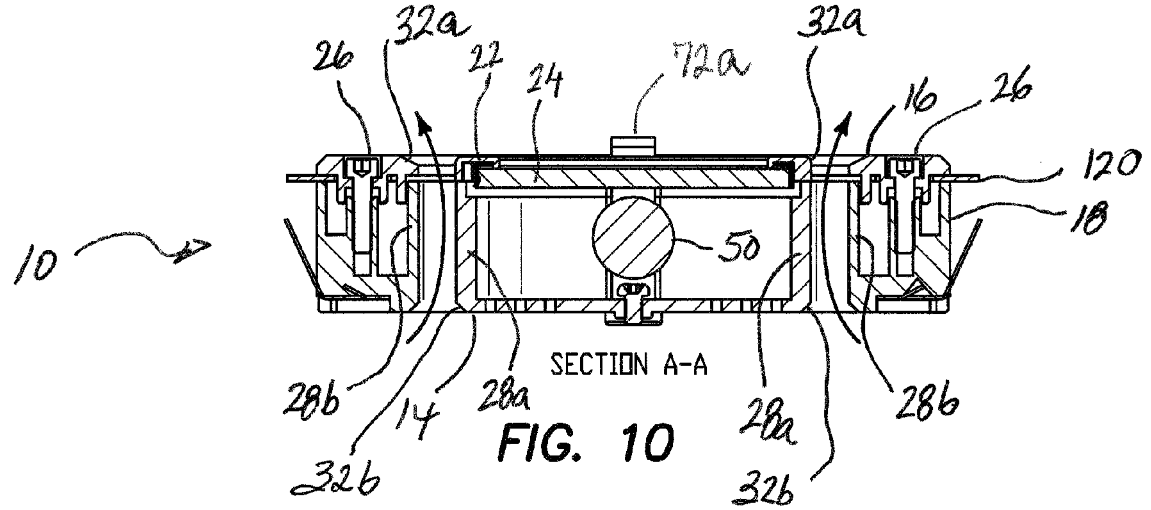
FIG. 10 is a cross-sectional view taken along line A-A in FIG. 3.

FIG. 10 shows in cross-section how each of the air passages 32 extend fully through puck housing 12 between bottom vent openings 34*a* and top vent openings 34*b* respectively, and that air passages 32 are closed to both the center compartment 34 as well as outer compartment 36. The cross-section of FIG. 10 also shows how the outer wall 18, inner walls 28*a* and 28*b* and mounting wall 38, as well as radial fins 30 are all formed integrally with puck housing 12, as by casting of a material chosen for heat conductivity, such as aluminum.

In operation of the puck light 10, the bulb 50 or other light source in center compartment 34 generates not only light but also a considerable amount of heat which, for one thing, heats the lamp socket 40 to an elevated temperature. The lamp socket 20 is, however, in thermal contact with mounting wall 34 which conducts heat away from the socket 40 and towards portion of partition 28 with air passages 32, where the heat is distributed among first inner wall 28*a*, second inner wall 28*b* and radial fins 30. These structures present a relatively large combined surface area distributed among air passages 32 and in heat exchanging contact with ambient air external to puck light 10 flowing through passages 32. Ambient air heated by the operating puck light 10 will tend to rise by convection into lower vent openings 34*a* and exhaust through top vent openings 34*b*, as suggested by the arrows in FIG. 10.

The lens holder 22 has a hinge tab 70 which reaches under cover plate 20 at 22*a* and hooks under the curled inner edge of the cover plate 20. Diametrically opposite to hinge tab 70 is a latch 72 which fits into an axial slot 74 defined in first inner wall 28*a* where it makes snap spring engagement with a raised catch 76 formed on the center facing side of the second inner wall 28*b*, as best seen in the cross-section of FIG. 9. Latch 72 is released by pressing radially inwardly latch end 72*a* so as to disengage the latch from catch 76, thereby allowing the lens holder 22 to swing about the captive end of hinge tab 70 from the normal, closed position shown in FIGS. 1 through 3 to an open position which allows access to the lamp 50 for relamping of the puck light 10 if needed. It will be appreciated that opening of the lens holder 22 does not expose any of the internal wiring of the puck light 10 during the relamping process, thereby permitting safe relamping by an end user without intervention by a licensed electrician.

The puck light 10 is provided with multiple knockout openings 80, including two generally opposed openings in outer wall 18 and two additional knockouts 80 in housing top 14. This permits a choice of wire access during installation of the fixture. If access is inconvenient through the top 14 of the fixture, electrical wiring can be introduced into the outer compartment 36 through one or both of the knockouts 80 in outer wall 18. If on the other hand access is convenient through the top 14, one of the knockouts 80 in housing top 14 may be selected for introducing a power cable into the outer compartment 36.

Raised spacers or stand-offs 82 are provided on the exterior of housing top 14 for the purpose of maintaining an exhaust and ventilation space between the puck light 10 and an overlying mounting surface to which the puck light is fastened, for example in the case where the puck light is surface mounted to the underside of a shelf.

Surface mounting of puck light 10 is accomplished by use of conventional mounting screws such as wood screws, passing through three mounting screw holes 84 in the housing top. The screw holes 84 also pass through stand offs 82 to ensure that the ventilation spacing is maintained between the puck light top 14 and the overlying mounting surface.

Figure 11:
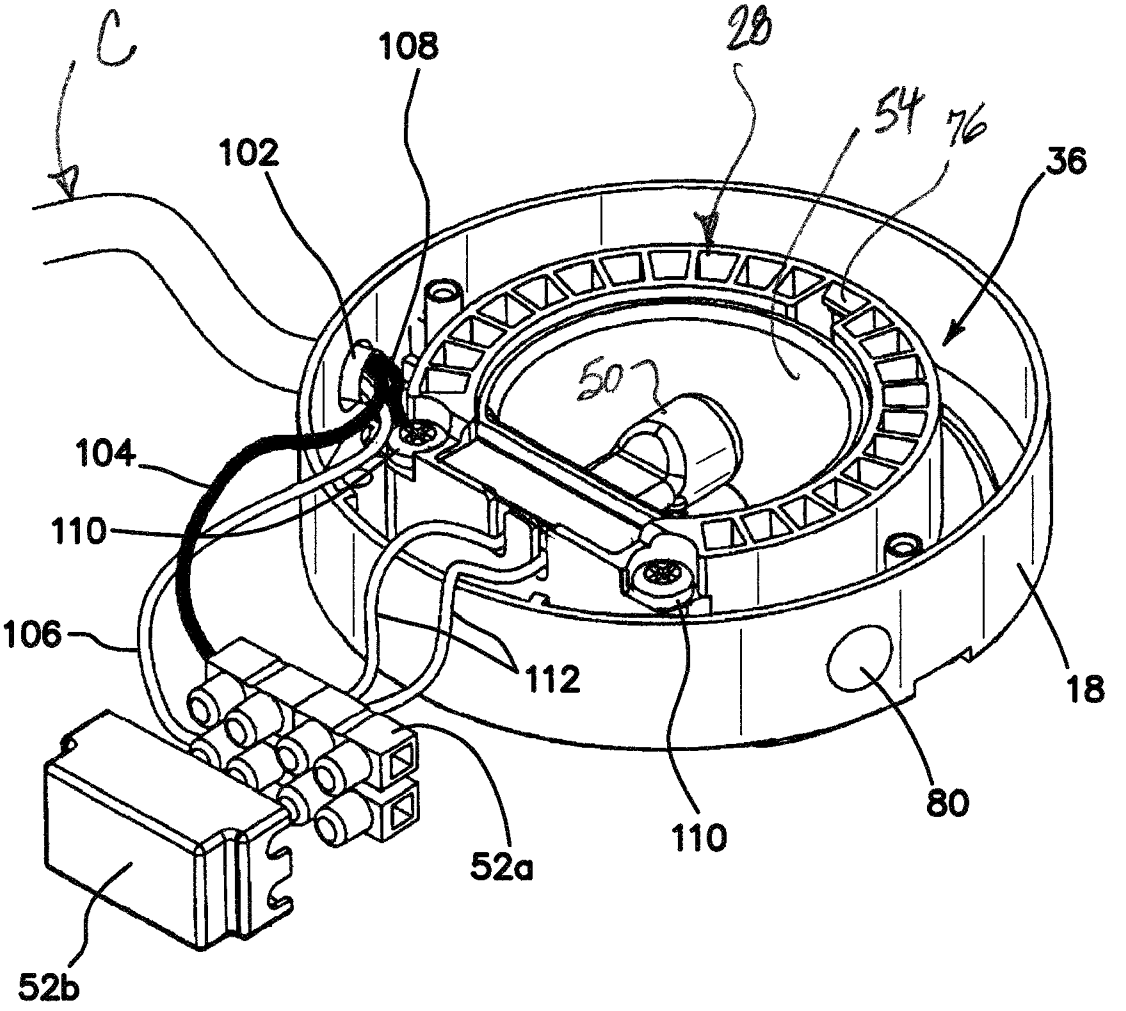
FIG. 11 is a perspective view showing typical hard wiring of the puck light of FIG. 1.

FIG. 11 illustrates how the puck light 10 is hardwired in the field using conventional electrical power cable C. The end 102 of cable C is introduced into outer compartment 36 through an open knockout 80 which in this example is located on outer wall 18. Cable C contains three insulated electrical wires, including a red colored positive conductor 104, a white colored neutral conductor 106, and a green colored ground conductor 108. The ground wire 108 is electrically connected to the puck light housing 12 by means of one of two grounding screws 110 engaged in corresponding internally threaded bosses 112 formed integrally with the puck light housing 12 as by the aforementioned metal casting of the same.

Terminal block 52 includes a terminal strip 52*a* and an insulating cover 52*b* which is removed during hardwiring as shown in FIG. 11. Terminal strip 52*a* is connected by internal insulated electrical wires 112 to the pins 44 of lamp socket 40. Positive and neutral wires 104, 106 respectively are connected to the appropriate terminals of terminal strip 52*a* so as to electrically connect each of these wires to a corresponding one of internal wires 112 and thereby supply electrical power to lamp 50 in socket 40. Once the wiring is completed as shown in the FIG. 11 the cover 52*b* is replaced over terminal strip 52*a* and the assembled terminal connector block 52 is returned to outer compartment 36 as shown in previous drawings, with the various wires bent and folded as needed to fit in compartment 36. Puck light 10 is then closed by assembling cover plate 20 to the bottom side of the puck light housing and fastening the cover plate with fasteners 26 as previously explained.

A chain of such puck lights 10 can be hardwired in the field with any desired spacing between adjacent puck lights 10 in the chain by interconnecting adjacent pairs of puck lights with interconnect lengths of conventional conductor such as 18-3SJT electrical cable. The interconnect hard wire connection is made using a second one of the knockouts 80, using the second ground screw 110 for the interconnect ground wire, and connecting the positive and neutral conductors of the interconnect to corresponding terminals at the opposite end of the terminal block 52 so as to transmit electrical power from the first puck light to a second puck light in a daisy chain installation.

Puck light 10 can be mounted in two ways: it can be surface mounted such that the housing top 14 is against a mounting surface, for example where the puck light is fastened to the underside of a shelf, or the puck light can be recess mounted in a hole cut in a mounting surface such that the puck housing 12 is recessed in the supporting structure with the housing bottom i.e. the cover plate 20 generally flush with the outer surface of the mounting structure, e.g. the puck light recessed in a hole cut in a false bottom of a cabinet with the cover plate flush with the bottom surface of the cabinet. In such case a false bottom is usually provided inside the cabinet to make a closed wiring space in the bottom of the cabinet through which an electrical power cable can reach the top of the puck light and be hardwired through the knockouts 80 in the housing top 14 of the puck light 10.

Another feature of the puck light 10 of this invention is a optional field installable trim ring 120 which can be mounted in an interference fit between cover plate 20 and the edge of the outer wall 18 and is secured once fasteners 26 are installed for holding the cover plate in place on the puck light 10. The trim ring 120 has an enlarged outside diameter greater than the diameter of outside wall 18 so as to cover and hide the edge of the mounting hole in which the recessed puck light is installed, for a more aesthetically pleasing and better finished installation. For purposes of recess mounting the puck light 10 can be fitted with a pair of retaining spring clips 128 which slide into clip receptacles 130 integrally formed with puck housing 12 as seen in FIGS. 4B, 7 and 10. When installed clips 128 are pressed against the outer wall 18 by the rim of the mounting hole and maintain an outward spring force to hold the puck light 10 in its recess hole.

While a particular embodiment of the invention has been described and illustrated for purposes of clarity and explanation, it must be understood that many changes, substitutions and modifications to the described embodiment will be apparent to those having only ordinary skill in the art without thereby departing from the scope of the invention which is defined by the following claims:

What is claimed is:

1. A puck light comprising a puck housing including a housing top and a housing bottom, an outer wall between said top and said bottom, a generally annular partition between said top and said bottom defining a central compartment and an outer compartment, said partition substantially closing said outer compartment against substantial flow of air from said central compartment, a terminal connector block in said outer compartment, a lamp socket in said central compartment electrically connected to said terminal block for powering a lamp supported in said socket, air passages defined through said partition between exterior vent openings in said top and said bottom, said passages being closed to each said compartment, such that ambient air flowing through said passages is in heat exchanging relationship with said partition for reducing heat flow across said partition from said central compartment thereby to maintain relatively low operating temperatures in said outer compartment relative to said central compartment.

2. The puck light of claim 1 wherein said partition comprises concentric inner walls connected by spaced apart radial fins for defining said air passages between said inner walls.

3. The puck of claim 1 wherein said lamp socket is in heat sinking contact with said partition such that heat from said socket is dissipated by conduction through said partition to said air flow.

4. The puck of claim 2 wherein said concentric inner walls form an arc and said arc is closed by a socket mounting wall, and further comprising socket retainers for holding said lamp socket in thermal contact with said mounting wall.

5. The puck light of claim 1 further comprising at least one knock-out opening in one or both of said housing top and said outer wall for introducing external electrical wiring into said outer compartment for connection to said terminal block.

6. The puck light of claim 2 wherein said housing top, said outer wall, said inner walls and said radial fins are formed as a single unit.

7. The puck light of claim 1 further comprising a domed light reflector removably fitted between said housing top and said lamp socket in said central compartment for reflecting light emitted by a lamp installed in said socket.

8. The puck light of claim 1 wherein said housing bottom includes a cover plate detachably secured to said housing top with removable fasteners and a lens holder defining said aperture and hinged to said outer rim for movement between a closed condition for holding a lens under said reflector and an open position admitting access for installation or replacement of a lamp in said lamp socket.

9. The puck light of claim 8 wherein said vent openings in said housing bottom of said air passages are disposed between said outer rim and said lens holder.

10. The puck light of claim 1 wherein said annular partition provides a light baffle against diffusion of light from said central compartment into said air passages.

11. The puck light of claim 7 further comprising one or more center slots in said housing top for venting said central compartment, said light reflector providing a light baffle against diffusion of light through said center slots.

12. The puck light of claim 11 further comprising one or more outer slots in said housing top for venting said outer compartment.

13. The puck light of claim 1 further comprising holes through said housing top in said outer compartment for passing mounting fasteners through said housing.

14. The puck light of claim 7 further comprising a center fastener for securing said reflector to said housing top.

15. The puck light of claim 1 wherein said terminal block is held in said outer compartment in a press fit between said outer wall and said partition.

16. The puck light of claim 3 wherein said socket is held in a press fit in a retaining structure integrally formed with said puck housing.

17. A puck light comprising:

a puck housing defining a central compartment encompassed by an outer compartment between a housing top and a housing bottom, a lamp socket in said central compartment and a generally annular partition between said central compartment and said outer compartment, said partition substantially closing flow of air between said inner and said outer compartments, an electrical wiring connector in said outer compartment, said socket electrically connected to said wiring connector through said partition, air passages in said partition, said air passages being open to the environment at opposite ends thereof but closed to each said compartment, so that ambient air flowing through said air passages is in heat exchanging relationship with said partition and heat produced by a lamp in said socket in said central compartment is dissipated by transfer to said ambient air flow prior to reaching said outer compartment thereby to maintain a lower operating temperature in said outer compartment.

18. A puck light comprising a housing including a circular central compartment encircled by an outer compartment and spaced therefrom by an annular gap substantially closed to said central and said outer compartments and open at a housing top and a housing bottom, said gap located between partition walls, said partition walls closing said central and said outer compartments against significant air flow therebetween, and spokes across said annular gap thermally interconnecting said central compartment and said outer compartment, such that ambient air flowing through said gap between said top and said bottom passes in heat exchanging contact with said spokes and heat flowing from a lamp in said central compartment through said spokes towards said outer compartment is carried away by said ambient air before reaching said outer compartment, thereby to maintain a lower operating temperature in said outer compartment.

19. The puck light of claim 18 wherein said central compartment is enclosed by a circular first inner one of said partition walls, said outer compartment extends radially between a second inner one of said partition walls and an outer circular wall, and said gap and said spokes extend between said first inner wall and said second inner wall.

20. The puck light of claim 19 wherein said central compartment houses a lamp socket in heat exchanging contact with said first inner one of said partition walls such that heat from said socket flows through said first inner one of said partition walls and onto said spokes for transfer to said ambient air flowing through said gap prior to reaching said outer compartment.

* * * * *